United States Patent
Minamoto et al.

(10) Patent No.: US 10,731,547 B2
(45) Date of Patent: Aug. 4, 2020

(54) CONTROL DEVICE AND METHOD FOR TURBOCHARGED ENGINE

(71) Applicant: Mazda Motor Corporation, Aki-gun, Hiroshima (JP)

(72) Inventors: Hiroshi Minamoto, Hiroshima (JP); Nobuo Yunoki, Aki-gun (JP); Kenichiro Suzuki, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 30 days.

(21) Appl. No.: 16/164,354

(22) Filed: Oct. 18, 2018

(65) Prior Publication Data

US 2019/0120128 A1    Apr. 25, 2019

(30) Foreign Application Priority Data

Oct. 23, 2017  (JP) .................. 2017-204466

(51) Int. Cl.
| | | |
|---|---|---|
| F02B 37/18 | (2006.01) | |
| F02B 37/00 | (2006.01) | |
| F02B 37/013 | (2006.01) | |
| F02B 37/22 | (2006.01) | |
| F02B 37/24 | (2006.01) | |

(Continued)

(52) U.S. Cl.
CPC .......... F02B 37/183 (2013.01); F02B 37/004 (2013.01); F02B 37/013 (2013.01);
(Continued)

(58) Field of Classification Search
CPC .............. F02B 2037/122; F02B 37/004; F02B 37/013; F02B 37/18; F02B 37/183;
(Continued)

(56) References Cited

U.S. PATENT DOCUMENTS

| | | | | |
|---|---|---|---|---|
| 7,735,320 B2 * | 6/2010 | Yanakiev | ................ | F01N 3/035 60/602 |
| 8,459,025 B2 | 6/2013 | Schwarte | | |

(Continued)

FOREIGN PATENT DOCUMENTS

| | | |
|---|---|---|
| EP | 1862654 A1 | 12/2007 |
| EP | 2009264 A2 | 12/2008 |

(Continued)

OTHER PUBLICATIONS

JPS61210223 Translation, Sep. 1986; Hanada Osatoshi.*
JP2017155657 Translation, Sep. 2017; Araki Keiji.*

*Primary Examiner* — Jesse S Bogue
(74) *Attorney, Agent, or Firm* — Alleman Hall Creasman & Tuttle LLP

(57) ABSTRACT

A smooth shift is achieved between an operating region in which a first turbocharger is mainly operated and an operating region in which a second turbocharger is mainly operated. A PCM controls a throttle valve to use a first supercharging region in which a gas flow through an exhaust bypass passage is reduced and a second supercharging region in which the gas flow through the exhaust bypass passage is promoted differently based on the operating state of an engine. In an early stage of a shift from the first supercharging region to the second supercharging region, the PCM executes bridge control to allow the flow velocity of exhaust gas flowing into a large turbine to be higher than at a point in time at which the shift starts.

5 Claims, 9 Drawing Sheets

(51) Int. Cl.
 *F02D 41/12* (2006.01)
 *F02D 41/10* (2006.01)
 *F02D 41/00* (2006.01)
 *F02B 37/12* (2006.01)

(52) U.S. Cl.
 CPC .............. *F02B 37/18* (2013.01); *F02B 37/22* (2013.01); *F02B 37/24* (2013.01); *F02D 41/0007* (2013.01); *F02D 41/10* (2013.01); *F02D 41/12* (2013.01); *F02B 2037/122* (2013.01); *F02D 41/0005* (2013.01)

(58) Field of Classification Search
 CPC ...... F02B 37/22; F02B 37/24; F02D 41/0005; F02D 41/0007; F02D 41/10; F02D 41/12
 See application file for complete search history.

(56) References Cited

U.S. PATENT DOCUMENTS

| | | | | |
|---|---|---|---|---|
| 8,640,459 | B2* | 2/2014 | Ge | F02B 37/004 60/612 |
| 8,671,682 | B2* | 3/2014 | Parlow | F02B 37/00 60/602 |
| 9,574,489 | B2* | 2/2017 | Schenker | F02B 37/004 |
| 9,835,094 | B2* | 12/2017 | Lahti | F02D 41/1446 |
| 2007/0062188 | A1* | 3/2007 | Fry | F02B 37/013 60/599 |
| 2009/0255517 | A1* | 10/2009 | Ishikawa | F02B 37/013 123/562 |
| 2010/0263638 | A1 | 10/2010 | Kogo et al. | |
| 2011/0036086 | A1* | 2/2011 | Liu | F02D 41/0007 60/602 |
| 2011/0192161 | A1* | 8/2011 | Takahaski | F02B 29/0412 60/602 |
| 2011/0296830 | A1* | 12/2011 | Tsukamoto | F02B 37/004 60/602 |

FOREIGN PATENT DOCUMENTS

| | | | |
|---|---|---|---|
| FR | 2936278 A1 | | 3/2010 |
| JP | S61210223 | * | 9/1986 |
| JP | 2005330811 A | | 12/2005 |
| JP | 2013133762 A | | 7/2013 |
| JP | 2017155657 | * | 9/2017 |

* cited by examiner

FIRST SUPERCHARGING REGION

TRANSITION REGION → BRIDGE CONTROL

RETURN CONTROL ←

SECOND SUPERCHARGING REGION

CONTROL DEVICE AND METHOD FOR TURBOCHARGED ENGINE

CROSS-REFERENCE TO RELATED APPLICATION

This application claims priority to Japanese Patent Application No. 2017-204466 filed on Oct. 23, 2017, the entire disclosure of which is incorporated by reference herein.

BACKGROUND

The present disclosure relates to a control device and method for a turbocharged engine.

Japanese Unexamined Patent Publication No. 2013-133762 discloses an example of a turbocharged engine. Specifically, this engine disclosed in Japanese Unexamined Patent Publication No. 2013-133762 includes: an exhaust passage that is connected to a combustion chamber; a first turbocharger (small turbocharger) that includes a first turbine (small turbine) disposed in that exhaust passage; and a second turbocharger (large turbocharger) that includes a second turbine (large turbine) disposed downstream of the first turbine in the exhaust passage.

The exhaust passage according to the above-described Japanese Unexamined Patent Publication No. 2013-133762 has a second supercharging passage (bypass passage) that bypasses the first turbine and reaches the second turbine, separately from a passage that reaches the second turbine via the first turbine, and a regulating valve that can open/close the second supercharging passage.

Furthermore, the engine disclosed in the above-described Japanese Unexamined Patent Publication No. 2013-133762 has its regulating valve opened or closed in accordance with its operating state so that a first supercharging region (first region) that reduces a gas flow through the second supercharging passage and a second supercharging region (second region) that allows the gas flow through the second supercharging passage are used differently.

For example, in the first supercharging region, the second supercharging passage is blocked by closing the regulating valve. This allows exhaust gas introduced into the exhaust passage to pass through the first turbine and then reach the second turbine without bypassing the first turbine. Thus, the first turbocharger is mainly operated.

On the other hand, in the second supercharging region, the second supercharging passage is released by opening the regulating valve. This allows a large portion of gas introduced into the exhaust passage to bypass the first turbine and reach the second turbine. Thus, the second turbocharger is mainly operated.

In the engine described in the above-described Japanese Unexamined Patent Publication No. 2013-133762, a shift is made from one of the aforementioned first and second supercharging regions to the other one depending on an operating state of the engine. In recent years, such a shift between regions has been desired to be smoothly performed to reduce pump loss, for example.

In view of the foregoing background, it is therefore an object of the present disclosure to provide a turbocharged engine that achieves a smooth shift between an operating region in which the first turbocharger is mainly operated and an operating region in which the second turbocharger is mainly operated.

SUMMARY

The present disclosure is directed to a control device for a turbocharged engine. The turbocharged engine includes: an exhaust passage that is connected to a combustion chamber; a first turbocharger that includes a first turbine disposed in the above-described exhaust passage; and a second turbocharger that includes a second turbine disposed downstream of the above-described first turbine in the above-described exhaust passage.

The exhaust passage includes a first supercharging passage that leads exhaust gas to the second turbine via the first turbine, a second supercharging passage that bypasses the first turbine and leads exhaust gas to the second turbine, a flow velocity changer that changes a flow velocity of exhaust gas flowing into the second turbine through at least either the first supercharging passage or the second supercharging passage, and a flow rate changer that changes a flow rate of exhaust gas flowing through the second supercharging passage.

The control device controls the flow rate changer so that a first supercharging region in which a gas flow through the second supercharging passage is reduced and a second supercharging region in which the gas flow through the second supercharging passage is promoted more than in the first supercharging region are used differently based on an operating state of the engine, and in an early stage of a shift from the first supercharging region to the second supercharging region, the control device controls the flow velocity changer so that bridge control is executed to allow the flow velocity of exhaust gas flowing into the second turbine to be higher than at a point in time at which the shift starts.

The above-described turbocharged engine is configured such that the control device controls the flow rate changer so that the first supercharging region in which the gas flow through the second supercharging passage is reduced and the second supercharging region in which the gas flow through the second supercharging passage is allowed are used differently.

In this manner, in the first supercharging region, since the gas flow through the second supercharging passage is reduced, a large portion of exhaust gas introduced into the exhaust passage reaches the second turbine after passing through the first turbine, without bypassing the first turbine. Thus, the first turbocharger is mainly operated in this operating region.

On the other hand, in the second supercharging region, since the gas flow through the second supercharging passage is promoted, a large portion of gas introduced into the exhaust passage bypasses the first turbine, and reaches the second turbine. Thus, the second turbocharger is mainly operated in this operating region.

However, simply switching the control mode of the flow rate changer cannot secure a sufficient number of revolutions of the second turbine when a shift is about to be made from the first supercharging region to the second supercharging region, for example. In consideration of a reduction in the boost pressure at the time of the shift, it is undesirable to switch the control mode of the flow rate changer in a state in which the number of rotations of the second turbine is not yet secured.

In order to reduce the degree to which the boost pressure is reduced due to a response delay at the time of the shift, for example, the control mode of the flow rate changer may be switched under the condition that the number of revolutions of the second turbine is sufficiently increased. In this case, in order to smoothly shift from the first supercharging region to the second supercharging region, the number of revolutions of the second turbine needs to be increased as promptly as possible in the transient period where the shift is about to be made (specifically, an early stage of the shift, before switching the control mode of the flow rate changer).

According to the above-described configuration, the control device executes bridge control in the early stage of the shift from the first supercharging region to the second supercharging region. At this time, the control device controls the flow velocity changer to increase the flow velocity of exhaust gas flowing into the second turbine. This can increase the number of revolutions of the second turbine as promptly as possible. In this manner, the control mode of the flow rate changer can be switched early, and consequently it is possible to shorten the shift period from the first supercharging region to the second supercharging region.

Accordingly, when a shift is about to be made from the first supercharging region to the second supercharging region, the shift period can be shortened while the degree to which the boost pressure is reduced is reduced. This allows a smooth shift to be made from the first supercharging region to the second supercharging region.

In addition, the above-described flow rate changer may be configured as a bypass valve that opens/closes the above-described second supercharging passage, and during the above-described bridge control, the degree of opening of the above-described bypass valve may be set to be smaller than at least at steady operation in the above-described second supercharging region.

With this configuration, since the degree of opening of the bypass valve is set to be smaller, exhaust gas flowing into the first turbine during the shift from the first supercharging region to the second supercharging region, that is, during the bridge control, can be secured. This can increase the number of revolutions of the second turbine while securing the number of revolutions of the first turbine. Thus, the degree to which the boost pressure is reduced at the time of the shift can be reduced more effectively.

In addition, the above-described flow velocity changer may be configured as a throttle valve that can change a cross sectional area of a flow passage at an inlet of the above-described second turbine, and the flow velocity changer may be controlled so that the cross sectional area of the flow passage is larger at steady operation after the bridge control and the shift to the second supercharging region than at least during the bridge control.

With this configuration, since the number of revolutions of the second turbine has already been secured at steady operation after a shift is made to the second supercharging region, there is no need to reduce the cross sectional area of the flow passage like that during the bridge control. Thus, at this time, the cross sectional area of the flow passage is relatively enlarged. In this manner, the flow velocity of exhaust gas flowing into the second turbine can be controlled more appropriately.

In addition, the above-described flow velocity changer may be configured as a throttle valve that can change a cross sectional area of a flow passage at an inlet of the above-described second turbine, and the flow velocity changer may be controlled so that the cross sectional area of the flow passage is larger at steady operation in the first supercharging region than at least during the bridge control.

With this configuration, since the first turbocharger is mainly operated at steady operation in the first supercharging region, there is no need to deliberately reduce the cross sectional area of the flow passage as in the bridge control. Thus, at this time, the cross sectional area of the flow passage is relatively enlarged. In this manner, flow resistance on the downstream side of the first turbine is reduced. This helps secure the supercharging efficiency.

In addition, when the number of revolutions of the above-described second turbine is increased to a predetermined value or higher during the execution of the above-described bridge control, the above-described control device may control the above-described flow rate changer to allow the gas flow through the above-described second supercharging passage, thereby ending the above-described bridge control and completing the shift to the above-described second supercharging region.

In a case where exhaust gas is allowed to flow into the second turbine through the first supercharging passage, exhaust gas passing through the first turbine to have exhaust energy consumed flows into the second turbine. This is inconvenient in securing the flow velocity of exhaust gas.

In contrast, according to the above-described configuration, exhaust gas is allowed to flow into the second turbine through the second supercharging passage. In this case, since bypassing the first turbine relatively increases exhaust energy, exhaust gas with a high flow velocity is allowed to flow into the second turbine.

In addition, the turbocharged engine may include a plurality of nozzle vanes disposed at an outer periphery of the second turbine, and a housing containing both the second turbine and the plurality of nozzle vanes and connected to a downstream end of the first supercharging passage. The plurality of nozzle vanes constitutes the flow velocity changer, and are disposed with a gap from an inner wall of the housing.

Another aspect of the present disclosure is directed to a control method for a turbocharged engine. The turbocharged engine includes: an exhaust passage connected to a combustion chamber; a first turbocharger that includes a first turbine disposed in the above-described exhaust passage; and a second turbocharger that includes a second turbine disposed downstream of the above-described first turbine in the above-described exhaust passage.

The exhaust passage includes a first supercharging passage that leads exhaust gas to the second turbine via the first turbine, a second supercharging passage that bypasses the first turbine and leads exhaust gas to the second turbine, a flow velocity changer that changes a flow velocity of exhaust gas flowing into the second turbine through at least either the first supercharging passage or the second supercharging passage, and a flow rate changer that changes a flow rate of exhaust gas flowing through the second supercharging passage.

The method includes: controlling the flow rate changer to use a first supercharging region in which a gas flow through the second supercharging passage is reduced and a second supercharging region in which the gas flow through the second supercharging passage is promoted more than in the first supercharging region differently based on an operating state of the engine; and in an early stage of a shift from the first supercharging region to the second supercharging region, controlling the flow velocity changer to execute bridge control so that the flow velocity of exhaust gas flowing into the second turbine is higher than at a point in time at which the shift starts.

According to the above-described method, when a shift is about to be made from the first supercharging region to the second supercharging region, the shift period can be shortened while the degree to which the boost pressure is reduced is reduced. This allows a smooth shift to be made from the first supercharging region to the second supercharging region.

Still another aspect of the present disclosure is directed to a control device for a turbocharged engine. The turbocharged engine includes: an exhaust passage that is connected to a combustion chamber; a first turbocharger that includes a first turbine disposed in the above-described exhaust passage; and a second turbocharger that includes a second turbine disposed downstream of the above-described first turbine in the above-described exhaust passage.

The exhaust passage includes a first supercharging passage that leads exhaust gas to the second turbine via the first turbine, a second supercharging passage that bypasses the first turbine and leads exhaust gas to the second turbine, a flow velocity changer that changes a cross sectional area of a flow passage of exhaust gas flowing into the second turbine through at least either the first supercharging passage or the second supercharging passage, and a flow rate changer that opens/closes to change a flow rate of exhaust gas flowing through the second supercharging passage.

A first supercharging region in which a gas flow through the second supercharging passage is reduced by setting a degree of opening of the flow rate changer to be a first degree of opening and a second supercharging region in which the gas flow through the second supercharging passage is allowed by setting the degree of opening of the flow rate changer to be a second degree of opening higher than the first degree of opening are used differently depending on an operating state of the engine. The degree of opening of the flow rate changer is changed from the second degree of opening to the first degree of opening when a shift is made from the second supercharging region to the first supercharging region, the flow velocity changer being controlled to execute return control to allow the cross sectional area of the flow passage to be larger than at least at a point in time at which the flow rate changer starts changing the degree of opening.

Furthermore, the flow velocity changer enlarges the cross sectional area of the flow passage over a longer time than a time required to change the degree of opening of the flow rate changer, in the return control.

With this configuration, the above-described turbocharged engine switches the degree of opening of the flow rate changer to use the first supercharging region in which the gas flow through the second supercharging passage is reduced and the first turbocharger is mainly operated and the second supercharging region in which the gas flow through the second supercharging passage is allowed and the second turbocharger is mainly operated differently depending on an operating state thereof.

However, when the degree of opening of the flow rate changer is changed so that a shift is made from the second supercharging region to the first supercharging region, simply switching the control mode of the flow rate changer cannot secure a sufficient number of revolutions of the first turbine from the start of the change in the degree of opening to immediately after the completion of the change in the degree of opening, for example. This is undesirable in consideration of a reduction in the boost pressure due to a response delay at the time of the shift.

Thus, the above-described control device executes the above-described return control at the time of the shift from the second supercharging region to the first supercharging region. At this time, the control device controls the flow velocity changer to allow the cross sectional area of the flow passage of exhaust gas flowing into the second turbine to be larger than at least at a point in time at which the flow rate changer starts changing the degree of opening. Increasing the cross sectional area of the flow passage reduces the flow velocity of exhaust gas flowing into the second turbine, while flow resistance near the first turbine that is positioned on the upstream side of the second turbine is reduced. This can increase the number of revolutions of the first turbine as promptly as possible.

However, if the cross sectional area of the flow passage is steeply increased, the number of revolutions of the second turbine may be completely dropped before the number of revolutions of the first turbine is sufficiently increased, and the boost pressure may be reduced at the time of the shift.

Thus, according to the above-described configuration, the control device enlarges the cross sectional area of the flow passage over a longer time than a time required to change the degree of opening of the flow rate changer, when the return control is executed. This can reduce of the degree to which the number of revolutions of the second turbine decreases, while increasing the number of revolutions of the first turbine. This can prevent the boost pressure from being reduced at the time of the shift.

Accordingly, the degree to which the boost pressure is reduced can be effectively reduced when a shift is about to be made from the second supercharging region to the first supercharging region. This allows a smooth shift to be made from the second supercharging region to the first supercharging region.

Yet another aspect of the present disclosure is directed to a control method for a turbocharged engine. The turbocharged engine includes an exhaust passage that is connected to a combustion chamber, a first turbocharger that includes a first turbine disposed in the above-described exhaust passage, and a second turbocharger that includes a second turbine disposed downstream of the above-described first turbine in the above-described exhaust passage.

The exhaust passage includes a first supercharging passage that leads exhaust gas to the second turbine via the first turbine, a second supercharging passage that bypasses the first turbine and leads exhaust gas to the second turbine, a flow velocity changer that changes a cross sectional area of a flow passage of exhaust gas flowing into the second turbine through at least either the first supercharging passage or the second supercharging passage, and a flow rate changer that opens/closes to change a flow rate of exhaust gas in the second supercharging passage.

The above-described control method includes in a first supercharging region, reducing a gas flow through the second supercharging passage by setting a degree of opening of the flow rate changer to be a first degree of opening; in a second supercharging region, allowing the gas flow through the second supercharging passage by setting the degree of opening of the flow rate changer to be a second degree opening higher than the first degree opening being used differently depending on an operating state of the engine; changing the degree of opening of the flow rate changer from the second degree of opening to the first degree of opening when a shift is made from the second supercharging region to the first supercharging region; controlling the flow velocity changer to execute return control to allow the cross sectional area of the flow passage to be larger than at least at a point in time at which the flow rate changer starts changing the degree of opening; and enlarging, via the flow velocity changer, the cross sectional area of the flow passage over a longer time than a time required to change the degree of opening of the flow rate changer, in the return control.

According to this method, the degree to which the boost pressure is reduced can be effectively reduced when a shift is about to be made from the second supercharging region to the first supercharging region. This allows a smooth shift to be made from the second supercharging region to the first supercharging region.

As can be seen from the foregoing description, according to the control device and the control method for the above-described turbocharged engine, a smooth shift can be made between an operating region in which the first turbocharger is mainly operated and an operating region in which the second turbocharger is mainly operated.

DETAILED DESCRIPTION

Figure 1:
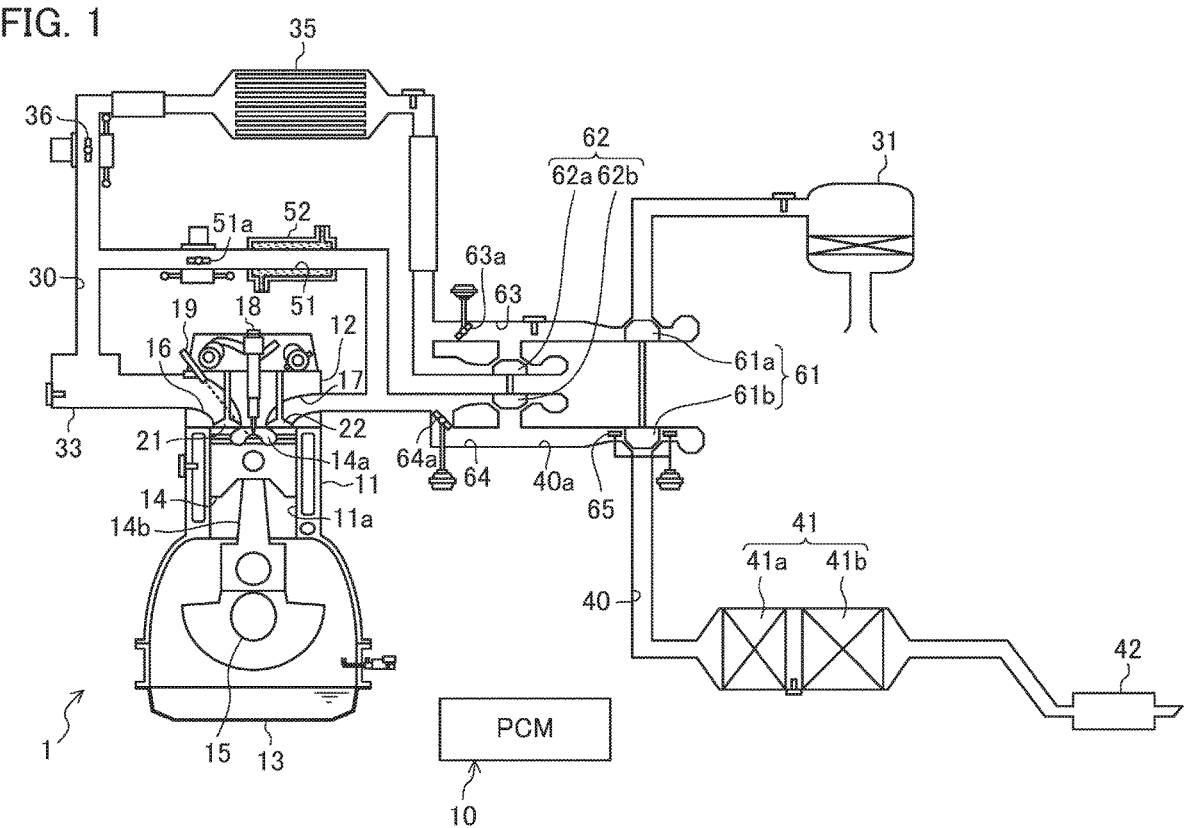
FIG. 1 is a schematic view exemplifying a configuration of a diesel engine.
Figure 2:
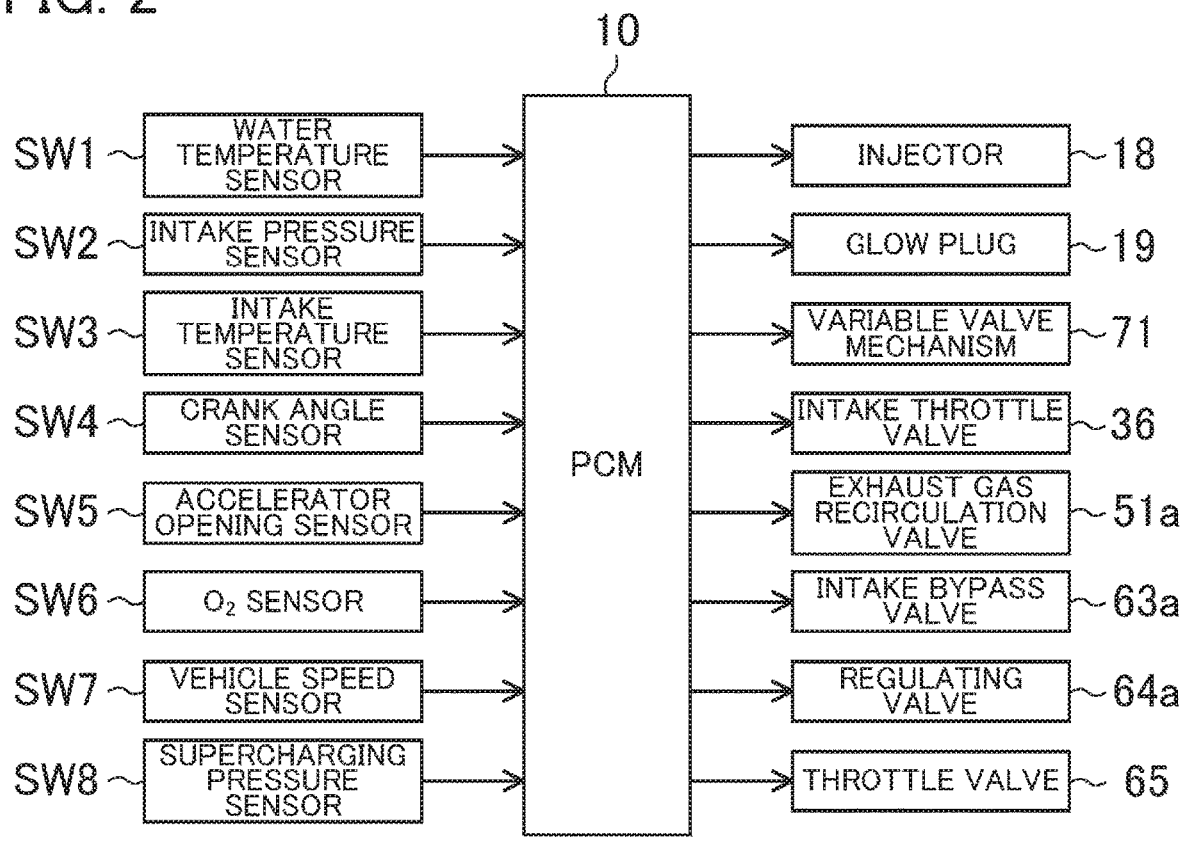
FIG. 2 is a block diagram exemplifying a configuration of a control device for a diesel engine.

Embodiments of a control device and method for a turbocharged engine will now be described in detail with reference to the drawings. The following descriptions are examples. FIG. 1 is a schematic view exemplifying a configuration of a diesel engine (hereinafter simply referred to as the "engine") 1. FIG. 2 is a block diagram exemplifying a configuration of a control device for the engine 1, and FIG. 3 exemplifies an operation map of a two-stage turbocharger. FIG. 4 is a schematic conceptual view showing how switching is performed between a first supercharging region A and a second supercharging region B.

(Overall Configuration of Engine)

The engine 1 is a four-stroke diesel engine that is installed in, for example, a four-wheel vehicle, and is supplied with fuel having light oil as its main component. As illustrated in FIG. 1, the engine 1 is a two-stage turbocharged engine comprising: an exhaust passage 40 that is connected to a combustion chamber 14a; a small turbocharger 62 (first turbocharger) that includes a small turbine 62b (first turbine) disposed in that exhaust passage 40; and a large turbocharger 61 (second turbocharger) that includes a large turbine 61b disposed downstream of the small turbine 62b in the exhaust passage 40.

A crank shaft 15, which is an output shaft of the engine 1, is connected to a drive wheel via a transmission (not shown). The engine 1 operates, so that, the engine output is transmitted to the drive wheel, thus driving the vehicle forward.

The engine 1 includes a cylinder block 11 provided with a plurality of cylinders 11a, a cylinder head 12 that is arranged above this cylinder block 11, and an oil pan 13 where lubricating oil is trapped and which is arranged below the cylinder block 11. Only one of the cylinders 11 is illustrated in FIG. 1. A piston 14 is reciprocatably fitted into each of the cylinders 11a of the engine 1. The top surface of the piston 14 has a cavity defining the reentrant combustion chamber 14a. This piston 14 is connected to the crank shaft 15 via a connecting rod 14b.

The cylinder head 12 has an intake port 16 and an exhaust port 17 for each of the cylinders 11a. An intake valve 21 that opens and closes an opening of the combustion chamber 14a is arranged in the intake port 16. Similarly, an exhaust valve 22 that opens and closes another opening of the combustion chamber 14a is arranged in the exhaust port 17.

The engine 1 comprises a variable valve mechanism 71 (see FIG. 2) that allows at least either a valve timing or a valve lift to vary, as a valve mechanism for driving each of the intake valve 21 and the exhaust valve 22. The variable valve mechanism 71 may have any one of various known mechanisms. The engine 1 changes at least either the valve timing or the valve lift of the intake valve 21, and also changes at least either the valve timing or the valve lift of the exhaust valve 22, depending on the operating state.

The cylinder head 12 is provided with an injector 18 that is configured to inject a fuel into the combustion chamber 14a, and a glow plug 19 that warms intake air in each of the cylinders 11a during the time during which the engine 1 is cold to enhance ignitability of the fuel. The injector 18 is arranged such that an injection port for injecting fuel starts from the ceiling surface of the combustion chamber 14a to face the combustion chamber 14a.

The injector 18 is configured so as to be capable of controlling the degree of opening of the injection port in an advanced manner, for example, so that partial injection is performed a plurality of times. As will be mentioned later, a PCM 10 inputs a pulse signal to the injector 18 to control the mode of injecting fuel through the injector 18. The mode of injecting fuel is controlled through the pulse width, input timing, and number of times of input of the pulse signal.

An intake passage 30 is connected to one side of the engine 1. The intake passage 30 communicates with the intake port 16 of each of the cylinders 11a, and introduces fresh air to the combustion chamber 14a of each of the cylinders 11a. On the other hand, an exhaust passage 40 is connected to the other side of the engine 1. The exhaust passage 40 communicates with the exhaust port 17 of each of the cylinders 11a, and exhausts burnt gas (that is, exhaust gas) from the combustion chamber 14a of each of the cylinders 11a. The aforementioned large turbocharger 61 and small turbocharger 62 that are configured to supercharge intake air are arranged in the intake passage 30 and exhaust passage 40.

An upstream end portion of the intake passage 30 is provided with an air cleaner 31 that filters intake air. On the other hand, a surge tank 33 is arranged in the vicinity of a downstream end of the intake passage 30. The intake passage 30 located downstream of the surge tank 33 constitutes independent passages for the respective cylinders 11a. The downstream end of each independent passage is connected to the intake port 16 of an associated one of the cylinders 11a.

A large compressor 61a of the large turbocharger 61, a small compressor 62a of the small turbocharger 62, an intercooler 35 that cools the air compressed by the large compressor 61a and the small compressor 62a, and an intake throttle valve 36 that adjusts the amount of intake air are arranged between the air cleaner 31 and the surge tank 33 in the intake passage 30. The intake throttle valve 36 is basically in its fully open state, but it is brought to its fully closed state at the shutdown of the engine to prevent shock.

An upstream portion of the exhaust passage 40 is configured as an exhaust manifold. The exhaust manifold has a plurality of independent passages corresponding to the cylinders 11a, respectively, and each connected to the outer end of an associated one of the exhaust ports 17, and an assembly in which the plurality of independent passages are assembled.

On the downstream side of the exhaust manifold in the exhaust passage 40, a small turbine 62b of the small turbocharger 62, a large turbine 61b of the large turbocharger 61, an exhaust gas purifier 41 that purifies hazardous components in exhaust gas, and a silencer 42 are arranged in this order from the upstream side.

The exhaust gas purifier 41 includes an oxidation catalyst 41a and a diesel particulate filter (hereinafter, referred to as the DPF) 41b. The oxidation catalyst 41a is disposed upstream of the DPF 41b. The oxidation catalyst 41a and the DPF 41b are contained in one case. The oxidation catalyst 41a has an oxidation catalyst supporting platinum, a substance in which palladium is added to platinum, or any other substance, and it promotes a reaction of generating $CO_2$ and $H_2O$ by oxidation of CO and HC in exhaust gas. In addition, the DPF 41b collects particulates such as soot included in exhaust gas of the engine 1. The DPF 41b may be coated with the oxidation catalyst.

An exhaust gas recirculation passage 51 is provided between the intake passage 30 and the exhaust passage 40. The exhaust gas recirculation passage 51 recirculates a portion of exhaust gas to the intake passage 30. The upstream end of the exhaust gas recirculation passage 51 is connected to a portion of the exhaust passage 40 between the exhaust manifold and the small turbine 62b (that is, the portion upstream of the small turbine 62b). The downstream end of the exhaust gas recirculation passage 51 is connected to a portion of the intake passage 30 between the surge tank 33 and the intake throttle valve 36 (that is, the portion downstream of the small compressor 62a). An exhaust gas recirculation valve 51a for adjusting the recirculation amount of exhaust gas to the intake passage 30, and an EGR cooler 52 for cooling exhaust gas with engine cooling water are arranged in the exhaust gas recirculation passage 51.

The large turbocharger 61 has the large compressor 61a arranged in the intake passage 30 and the large turbine 61b arranged in the exhaust passage 40. The large compressor 61a and the large turbine 61b are connected together, and are configured to rotate together. The large compressor 61a is arranged between the air cleaner 31 and the intercooler 35 in the intake passage 30. On the other hand, the large turbine 61b is arranged between the exhaust manifold and the oxidation catalyst 41a in the exhaust passage 40.

The small turbocharger 62 has the small compressor 62a arranged in the intake passage 30 and the small turbine 62b arranged in the exhaust passage 40. The small compressor 62a and the small turbine 62b are connected together, and are configured to rotate together. The small compressor 62a is arranged downstream of the large compressor 61a in the intake passage 30. On the other hand, the small turbine 62b is arranged upstream of the large turbine 61b in the exhaust passage 40.

More specifically, in the intake passage 30, the large compressor 61a and the small compressor 62a are arranged in series in this order from the upstream side. In contrast, in the exhaust passage 40, the small turbine 62b and the large turbine 61b are arranged in series in this order from the upstream.

Due to rotations of the large turbine 61b and the small turbine 62b by an exhaust gas flow, each of the large compressor 61a and the small compressor 62a rotates, thereby compressing intake air.

In this regard, the small turbocharger 62 is relatively small, and the large turbocharger 61 is relatively large. More specifically, the large turbine 61b of the large turbocharger 61 has higher inertia than the small turbine 62b of the small turbocharger 62.

An intake bypass passage 63 that bypasses the small compressor 62a is connected to the intake passage 30. An intake bypass valve 63a is arranged in the intake bypass passage 63. The intake bypass valve 63a adjusts the quantity of air flowing through the intake bypass passage 63. The intake bypass valve 63a is brought to its fully closed state when not energized (normally closed).

An exhaust bypass passage 64 that bypasses the small turbine 62b is connected to the exhaust passage 40. In other words, as illustrated in FIG. 4, when a portion of the exhaust passage 40 that leads exhaust gas to the large turbine 61b via the small turbine 62b is called a supercharging passage 40a (first supercharging passage), the exhaust passage 40 defined in the present embodiment includes that supercharging passage 40a and the exhaust bypass passage 64 (second supercharging passage) that leads exhaust gas to the large turbine 61b while bypassing the small turbine 62b.

A regulating valve 64a for adjusting the amount of exhaust gas flowing through the exhaust bypass passage 64 is arranged in the exhaust bypass passage 64. The regulating valve 64a is brought to its fully open state when not energized (normally open). The regulating valve 64a exemplifies the "flow rate changer (bypass valve)" in that it is openable/closable to change the flow rate of exhaust gas flowing through the exhaust bypass passage 64.

In a portion of the exhaust passage 40 at the inlet of the large turbine 61b, that is, a portion of the exhaust passage 40 immediately upstream of the large turbine 61b, a throttle valve 65 for changing the cross sectional area of the flow passage forming the portion immediately upstream of the large turbine 61b is arranged. Although described below in detail, the throttle valve 65 includes a plurality of nozzle vanes (lead vanes 65a) that are turnable around the support shaft, and is configured to change the degree of opening of each nozzle vane to change the flow passage cross sectional area of exhaust gas flowing into the large turbine 61b through at least either the supercharging passage 40a or the exhaust bypass passage 64. For example, if the number of revolutions of the engine 1 is small, the flow velocity of exhaust gas flowing into the turbine cascade can be increased by reducing the degree of opening of each of the nozzle vanes to a low degree, and the supercharge efficiency can be increased by causing the flow direction to correspond to the tangential direction (that is the circumferential direction) of the turbine 61b. The throttle valve 65 is an example of the "flow velocity changer".

In addition, the engine 1 is configured to have a relatively low compression ratio, wherein the geometrical compression ratio is 12 or higher and 15 or lower. The engine 1 intends to improve the exhaust emission performance and thermal efficiency by reducing compression ratio.

(Configuration of Control Device of Engine)

The engine 1 configured as mentioned above is controlled by a powertrain control module (hereinafter referred to as the PCM) 10. The PCM 10 is configured as a microprocessor including a CPU, a memory, a counter/timer group, an interface, and a path that connects these units together. This PCM 10 constitutes the control device.

As illustrated in FIG. 2, detection signals of various sensors are input to the PCM 10. Examples of the various sensors include a water temperature sensor SW1 that detects the temperature of engine cooling water, an intake pressure sensor SW2 that detects the pressure of intake air, an intake temperature sensor SW3 that detects the temperature of intake air, a crank angle sensor SW4 that detects the rotation angle of the crank shaft 15, an accelerator opening sensor SW5 that detects the degree of opening of an accelerator corresponding to the amount of operation of an accelerator pedal (not illustrated) of a vehicle, an 02 sensor SW6 that detects the oxygen concentration in exhaust gas, a vehicle speed sensor SW7 that detects the vehicle speed, and a supercharging pressure sensor SW8 that is attached to the surge tank 33 and detects the pressure of air supplied to the combustion chamber 14a.

The PCM 10 performs various calculations based on detection signals of these sensors SW1 to SW8 to determine the state of the engine 1 or vehicle, and outputs control signals to actuators of the injector 18, the glow plug 19, the variable valve mechanism 71, the intake throttle valve 36, the exhaust gas recirculation valve 51a, the intake bypass valve 63a, the regulating valve 64a, and the throttle valve 65, respectively.

The basic control of the engine 1 by the PCM 10 allows determination of a target torque based on the degree of opening of the accelerator, the vehicle speed, and the gear position of the transmission, and allows the injector 18 to inject fuel in accordance with the target torque. The PCM 10 also controls the recirculation ratio of exhaust into the cylinders 11a by controlling the degree of opening of the intake throttle valve 36 or exhaust gas recirculation valve 51a (that is, external EGR control) and/or controlling the variable valve mechanism 71 (that is, internal EGR control).

In addition, for example, the PCM 10 detects the supercharging pressure at the present time (hereinafter referred to as the "actual supercharging pressure") based on the detection signal of the supercharging pressure sensor SW8.

On the other hand, the PCM 10 determines the state of the engine 1 or vehicle from other sensors, and computes a target value of the supercharging pressure (hereinafter, referred to as the "target supercharging pressure") based on that determination result. Furthermore, the PCM 10 adjusts the degrees of opening of the intake bypass valve 63a, the regulating valve 64a, and the throttle valve 65 such that the actual supercharging pressure is equal to the target supercharging pressure.

In this manner, the PCM 10 controls operation of the large turbocharger 61 and the small turbocharger 62 through the intake bypass valve 63a, the regulating valve 64a, and the throttle valve 65.

In addition, the PCM 10 is configured to selectively use an operating region A (hereinafter, referred to as the "first supercharging region") in which the large turbocharger 61 mainly operates and an operating region B (hereinafter referred to as the "second supercharging region") in which the small turbocharger 62 mainly operates when the engine 1 is operated.

Figure 3:
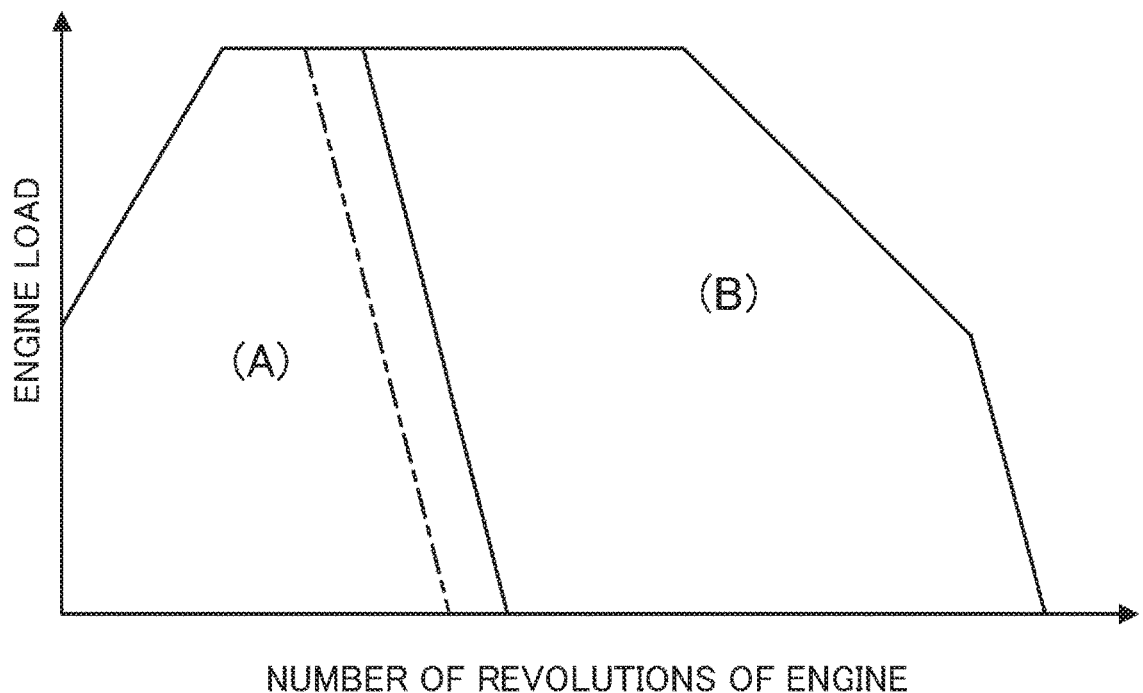
FIG. 3 exemplifies an operation map of a two-stage turbocharger.
Figure 4:
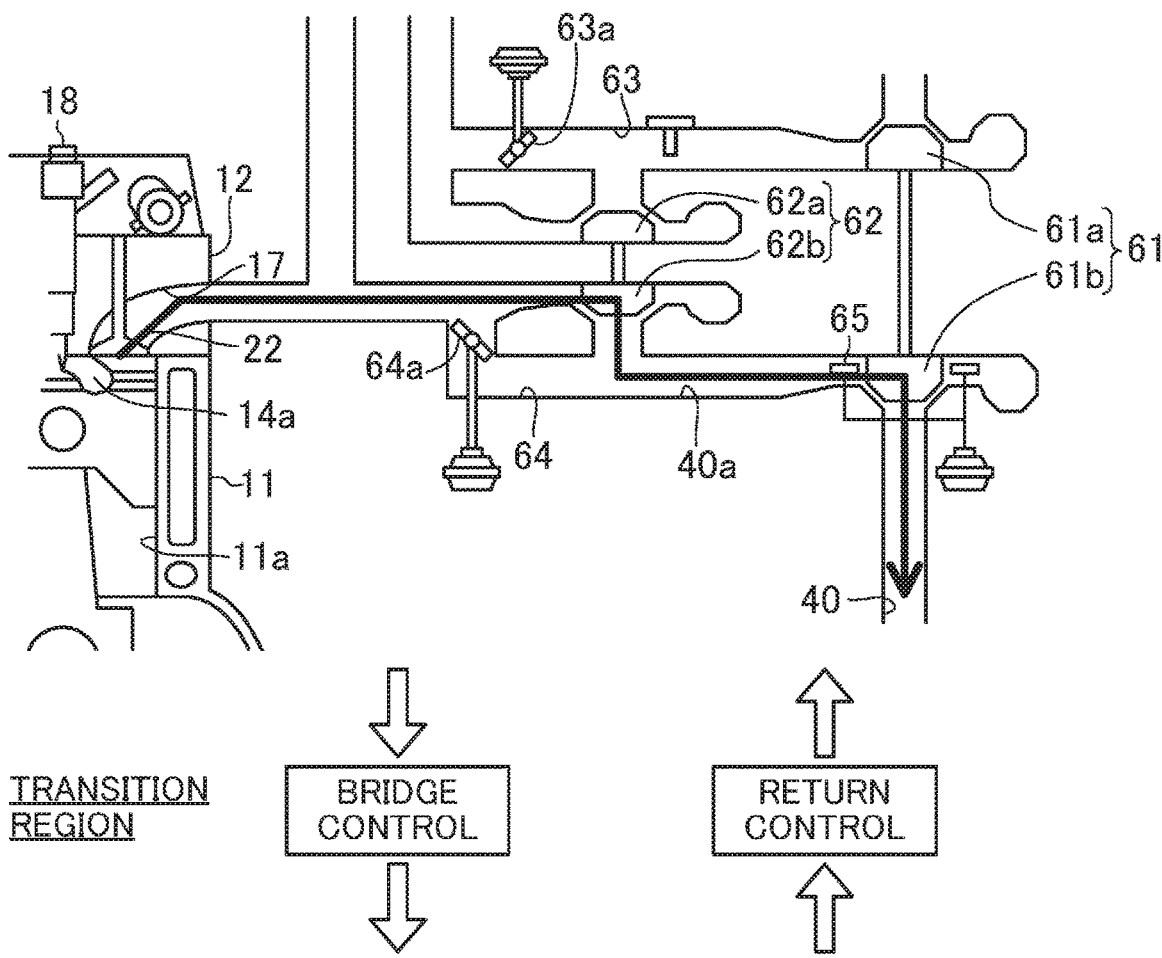
FIG. 4 is a schematic conceptual view showing how switching is performed between a first supercharging region and a second supercharging region.
Figure 4:
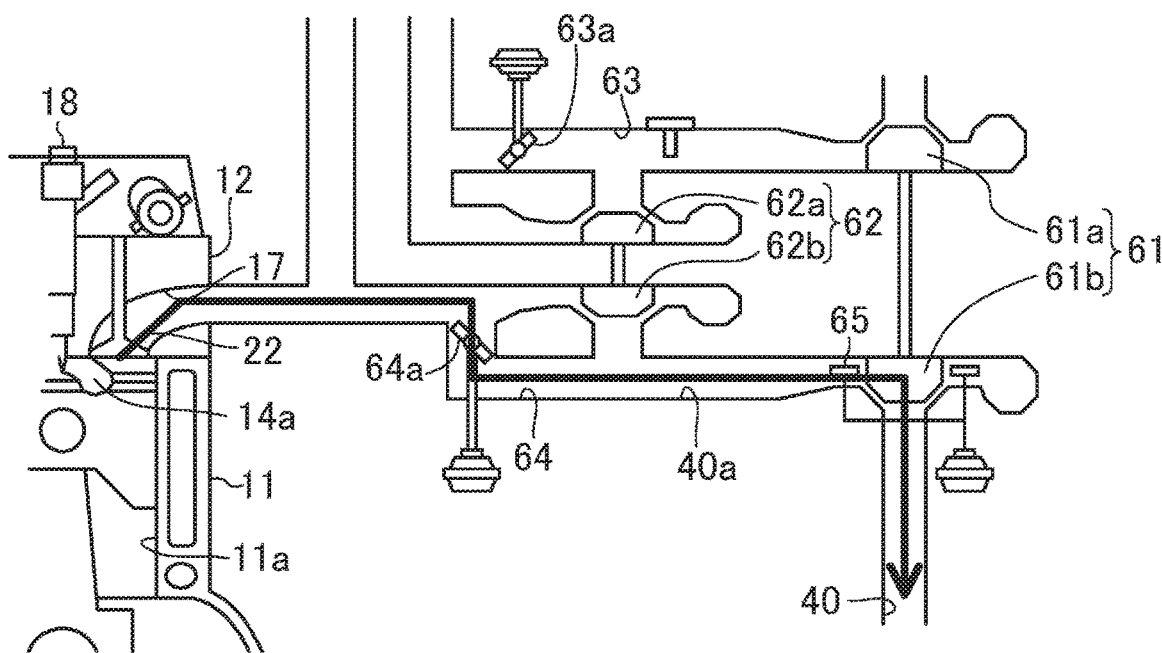

More particularly, as shown in an exemplary operation map in FIG. 3, the PCM 10 reduces the gas flow through the intake bypass passage 63 and the exhaust bypass passage 64 by allowing the intake bypass valve 63a and the regulating valve 64a to have a degree of opening other than the highest degree of opening in the first supercharging region A, where the number of revolutions of the engine is lower than that on the switching line indicated by the solid line. This allows a large portion of intake air to pass through the small compressor 62a on the intake side, while allowing a large portion of exhaust gas to pass through the small turbine 62b on the exhaust side. As a result, the small turbocharger 62 mainly operates (see an upper portion of FIG. 4).

On the other hand, since the small turbocharger 62 serves as an exhaust resistance in the second supercharging region B, where the number of revolutions of the engine is higher than that on the switching line in FIG. 3, the intake bypass valve 63a and the regulating valve 64a are determined to have a degree of opening close to their respective highest degrees to promote the gas flow through the intake bypass passage 63 and the exhaust bypass passage 64. This allows a large portion of intake air to bypass the small compressor 62a on the intake side, while allowing a large portion of exhaust gas to bypass the small turbine 62b on the exhaust side. As a result, the large turbocharger 61 mainly operates (see a lower portion of FIG. 4).

Note that the dot-dash line in FIG. 3 indicates a line at which the regulating valve 64a starts opening. The switching line indicated by the solid line is a line at which the regulating valve 64a is fully opened. Accordingly, the regulating valve 64a is set to have an intermediate degree of opening between the dot-dash line and the solid line. The throttle valve 65 is set to be slightly open to prevent excessive supercharging while the number of revolutions of the engine is high and a high load is applied to the engine.

(Configuration of Small/Large Turbine)

The hard configurations around the small and large turbines 62b, 61b will now be temporarily described in order to describe the first supercharging region A and the second supercharging region B in detail.

Figure 7:
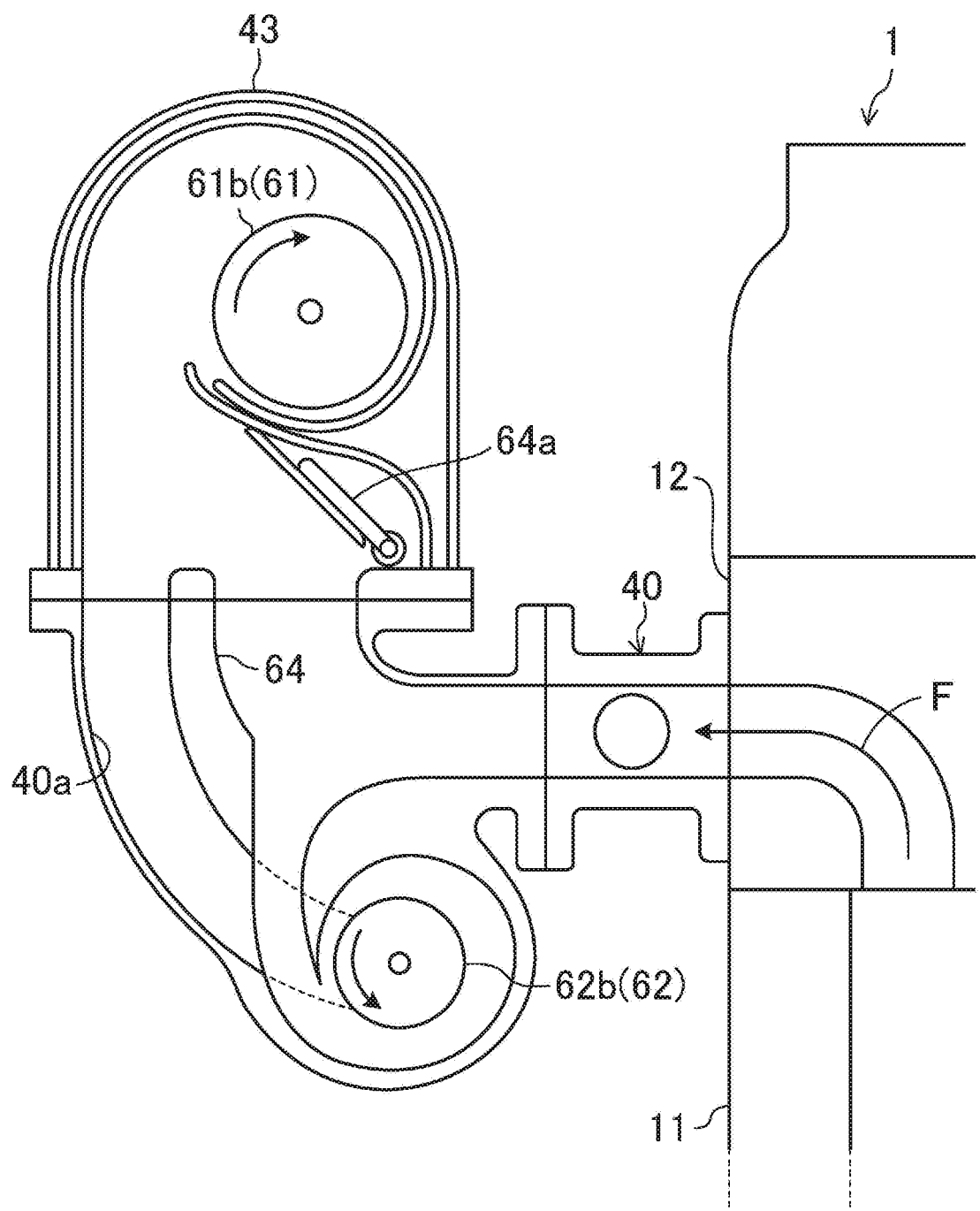
FIG. 7 is a longitudinal sectional view of a large turbocharger and a small turbocharger.
Figure 8:
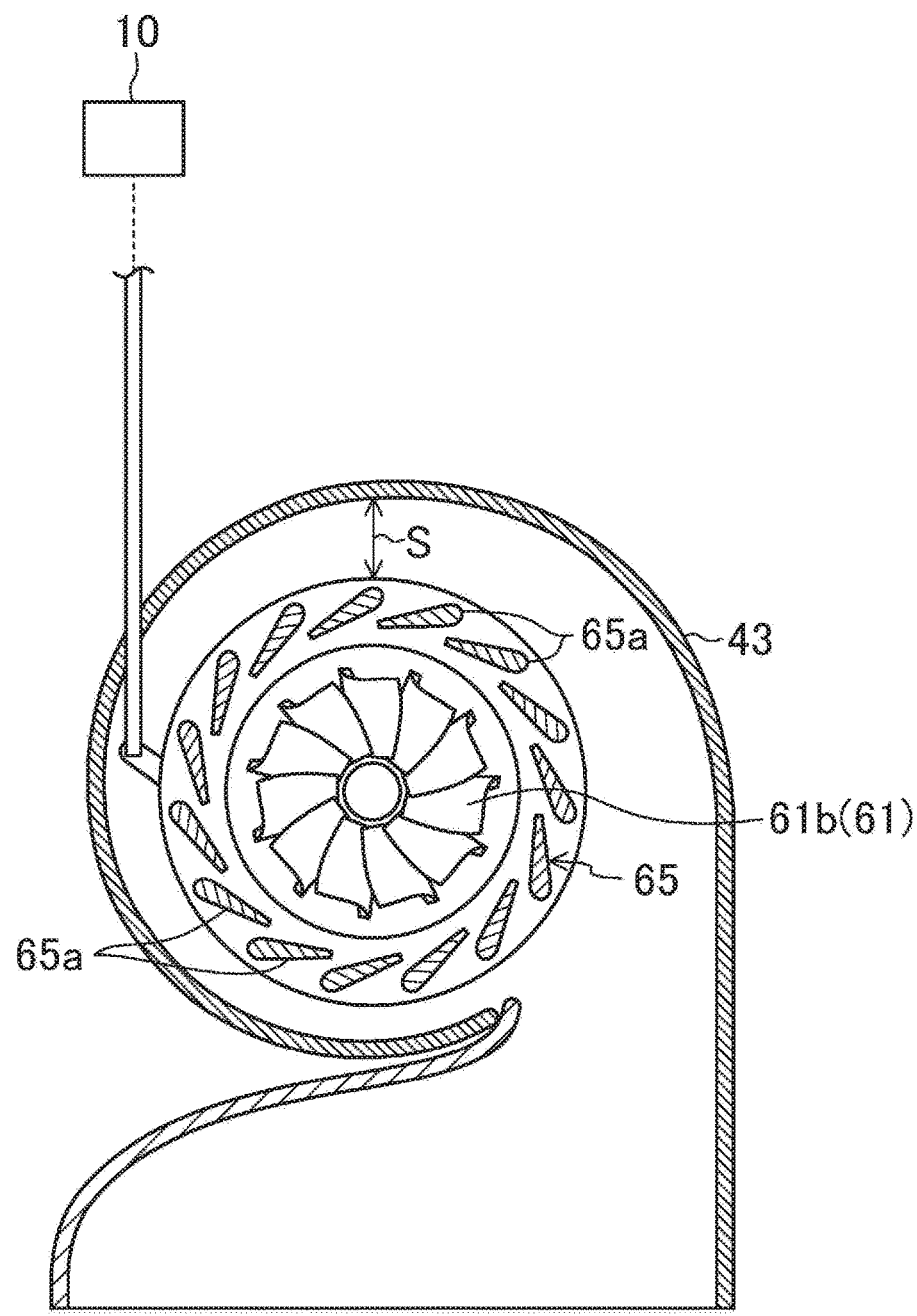
FIG. 8 is a longitudinal sectional view of a throttle valve.

FIG. 7 is a longitudinal sectional view of the large and small turbochargers 61, 62, and FIG. 8 is a longitudinal sectional view of the throttle valve 65. FIG. 9 illustrates a comparison between a flow of exhaust in the first supercharging region A and a flow of exhaust in the second supercharging region B.

As illustrated in FIGS. 7 to 9, the large turbocharger 61 has the plurality of lead vanes (nozzle vanes) 65a disposed at the outer periphery of the large turbine 61b, and a turbine case 43 (housing) containing both the large turbine 61b and the plurality of lead vanes 65a and connected to the downstream end of the supercharging passage 40a.

In this case, the plurality of lead vanes 65a constitute the throttle valve 65, which can change the cross sectional area of the flow passage at the inlet of the large turbine 61b, and are disposed with a gap (see the two-headed arrow S in FIG. 8) from the inner wall of the turbine case 43.

More particularly, the plurality of lead vanes 65a are disposed radially (a radial direction with respect to the rotation axis of the large turbine 61b) outward from the large turbine 61b, and are disposed at regular intervals along the outer periphery of the large turbine 61b.

Furthermore, the plurality of lead vanes 65a are each configured to turn around a rotation axis that is set to be substantially coaxial with the large turbine 61b, and through the turning operation, the cross sectional area of the flow passage from the turbine case 43 to the large turbine 61b is adjusted.

In addition, the inner wall of the turbine case 43 extends in a substantially circumferential form when seen in a cross section perpendicular to the rotation axis of the large turbine 61b and the lead vanes 65a, and faces the lead vanes 65a with a gap therebetween.

A known turbocharger including a wastegate valve instead of the throttle valve 65, for example, could reduce the gap between the turbine case and the large turbine. Thus, since the cross sectional area of the flow passage is relatively throttled, the number of revolutions of the large turbine will be relatively promptly increased. Accordingly, a smooth shift can be made from the first supercharging region A to the second supercharging region B.

However, if the throttle valve 65 illustrated in FIGS. 7 to 9 is employed, a gap between the turbine case 43 and the large turbine 61*b* will be required to secure a space where the plurality of lead vanes 65*a* are to be disposed. Since the cross sectional area of the flow passage is thus relatively broadened, the number of revolutions of the large turbine 61*b* is less likely to increase than if the wastegate valve is employed. Thus, when a shift is about to be made from the first supercharging region A to the second supercharging region B, the boost pressure may decrease as described below.

Figure 9A:
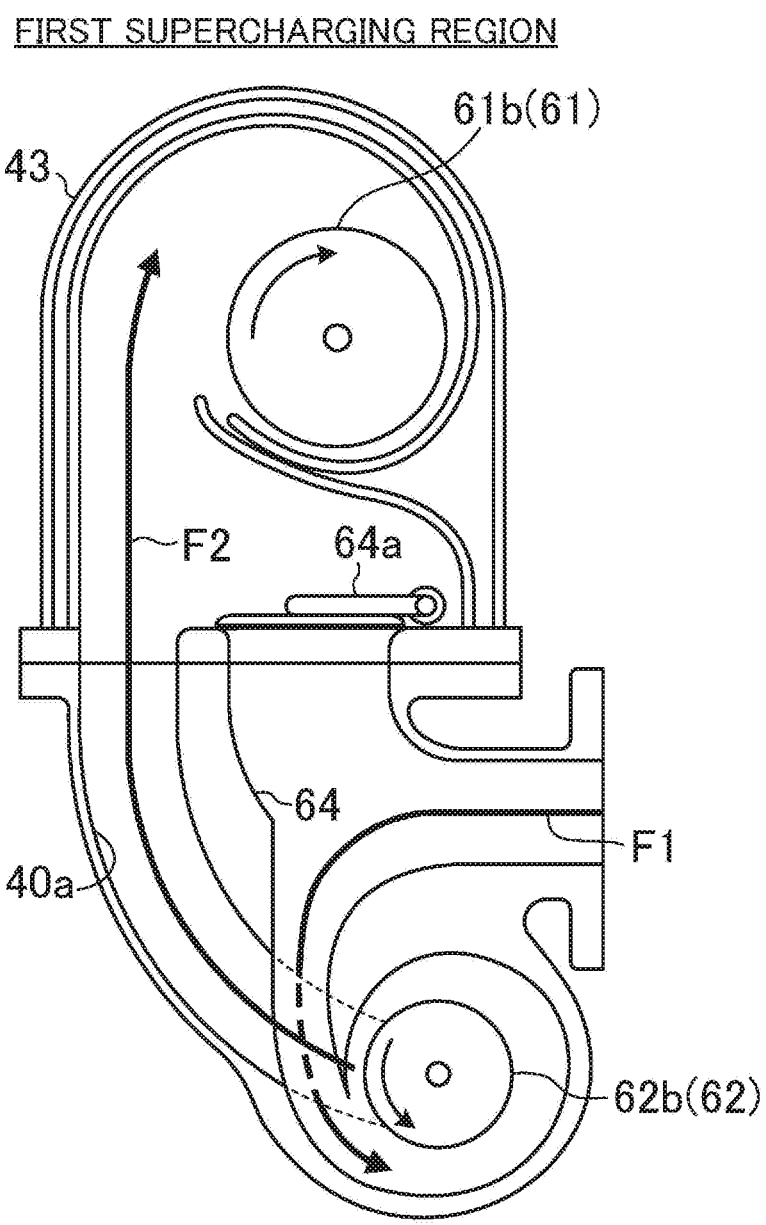
FIGS. 9A and 9B illustrate a comparison between a flow of exhaust in a first supercharging region and a flow of exhaust in a second supercharging region.
Figure 9B:
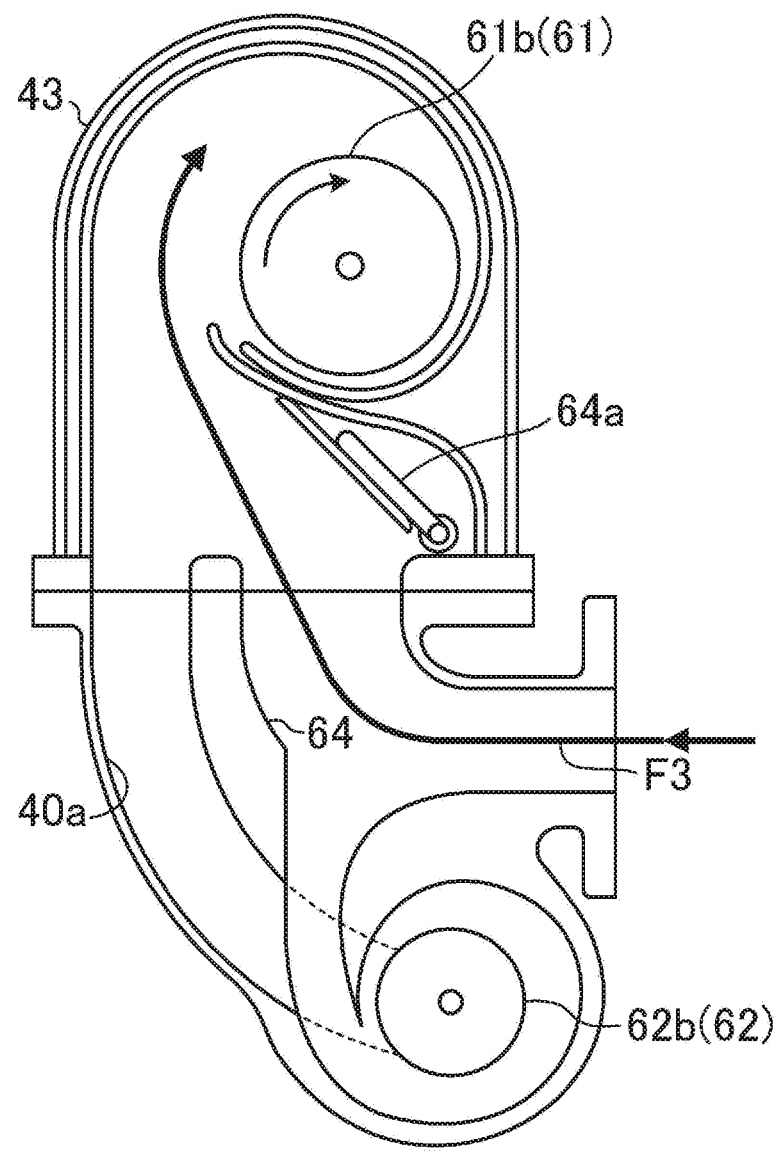

Exhaust gas that has flowed into the exhaust passage 40 as indicated by the arrow F in FIG. 7 reaches the large turbine 61*b* through different flow passages depending on the operating region of the engine 1, as illustrated in FIGS. 9A and 9B. In this case, as can be seen from the comparison between the arrows F1 to F2 in FIG. 9A and the arrow F3 in FIG. 9B, since the exhaust gas passes through the small turbine 62*b* in the first supercharging region A, the flow passage in the first supercharging region A is longer than that in the second supercharging region B.

(Control Related to Switching Between First Supercharging Region and Second Supercharging Region)

In the engine 1 according to the operation map as illustrated in FIG. 3, a shift is made from one of the aforementioned first supercharging region A and second supercharging region B to the other one depending on an operating state thereof. In recent years, such a shift between regions has been desired to be smoothly performed to reduce pump loss, for example.

To satisfy the need, as illustrated in FIG. 4, the PCM 10 is configured to execute bridge control when a transition is made from the first supercharging region A to the second supercharging region B, whereas the PCM 10 is configured to execute return control (second bridge control) when a transition is made from the second supercharging region B to the first supercharging region A.

Details of the bridge control and the return control will now be described in sequence.

—Bridge Control—

As already described, switching is made from the first supercharging region A to the second supercharging region B through an adjustment to the degree of opening of the regulating valve 64*a* in the exhaust passage 40.

However, merely changing the degree of opening of the regulating valve 64*a* cannot secure a sufficient number of revolutions of the large turbine 61*b* in a transient period where a shift is about to be made from the first supercharging region A to the second supercharging region B (specifically, early stages of the shift before changing the degree of opening of the regulating valve 64*a*). In consideration of the possibility of reducing the boost pressure at the time of the shift, it is undesirable to change the degree of opening of the regulating valve 64*a* without securing a sufficient number of revolutions of the large turbine 61*b*.

In order to reduce the degree to which the boost pressure is reduced at the time of the shift, for example, the degree of opening of the regulating valve 64*a* may be changed under the condition that the number of revolutions of the large turbine 61*b* is sufficiently increased. In this case, in order to smoothly shift from the first supercharging region A to the second supercharging region B, the number of revolutions of the large turbine 61*b* needs to be increased as promptly as possible in the transient period where the shift is about to be made.

To satisfy the need, The PCM 10 controls the throttle valve 65 in early stages of the shift from the first supercharging region A to the second supercharging region B execute the bridge control, which increases the flow velocity of exhaust gas flowing into the large turbine 61*b* as compared to at a point in time at which the shift has started, (at the time of steady operation in the first supercharging region A immediately before the shift).

During the bridge control, the degree of opening of the regulating valve 64*a* is set to be relatively lower (closed side) than at least at steady operation in the second supercharging region B. In response to an increase in the number of revolutions of the large turbine 61*b* to a predetermined value or higher, the degree of opening of the regulating valve 64*a* is changed to a degree of opening that is relatively higher (open side) to allow the gas flow through the exhaust bypass passage 64. In response to this change to the open side, the bridge control through the throttle valve 65 is finished, and the shift to the second supercharging region B is completed.

Figure 5:
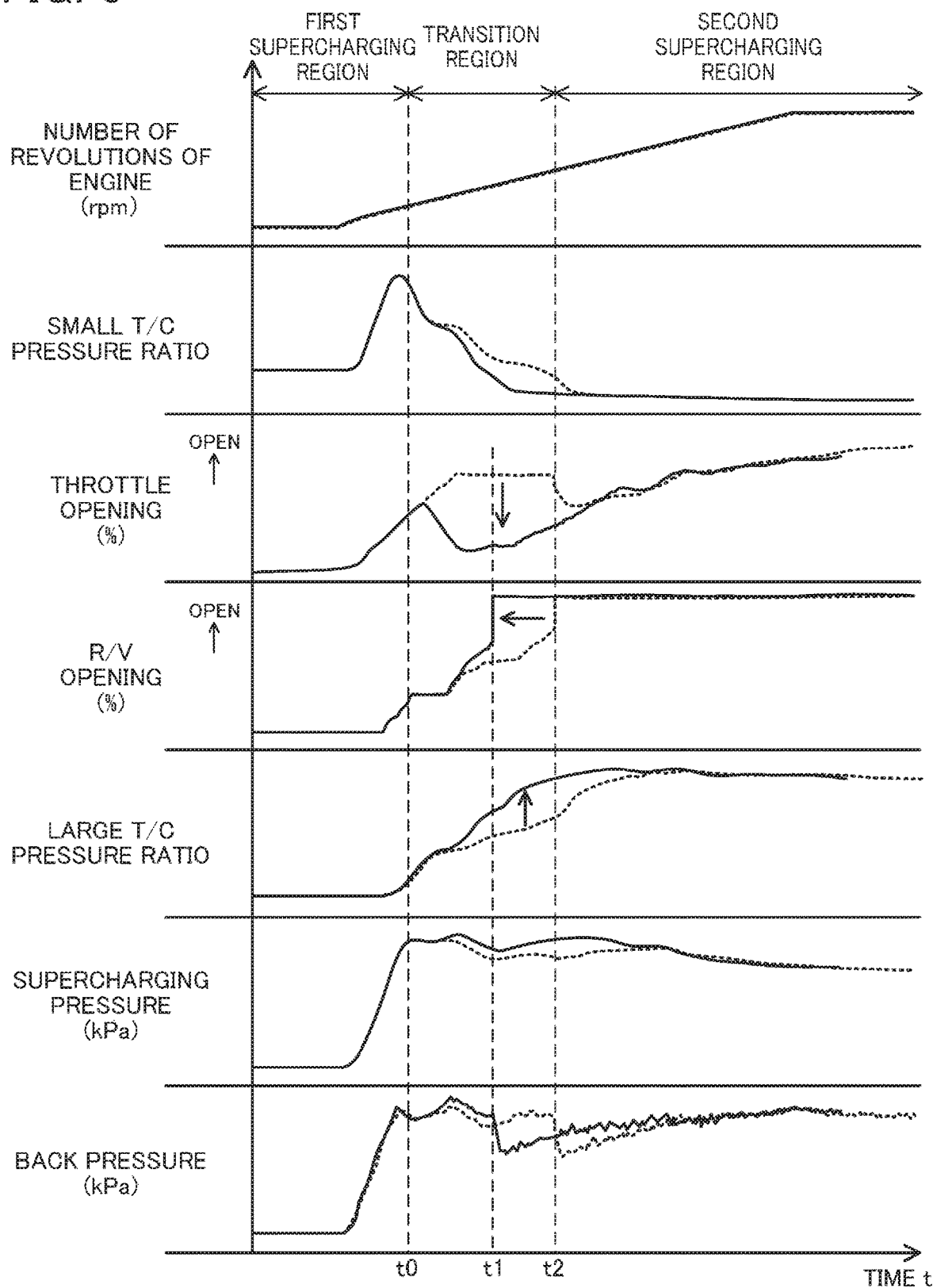
FIG. 5 is a time chart showing a specific example of a bridge control.

FIG. 5 is a time chart showing a specific example of the bridge control. Specifically, the example shown in FIG. 5 indicates changes in the ratio between exhaust pressures on the upstream side and the downstream side of the small turbine 62*b* (small T/C pressure ratio), the degree of opening of the throttle valve 65 (throttle opening degree), the degree of opening of the regulating valve 64*a* (R/V opening degree), the ratio between exhaust pressures on the upstream side and the downstream side of the large turbine 61*b* (large T/C pressure ratio), and the supercharging pressure and the exhaust pressure (back pressure), when the number of rotations of the engine is linearly increased. The solid line in FIG. 5 is a time chart where the aforementioned bridge control is executed, and the broken line is a time chart where a known configuration in which the bridge control is not executed is employed.

Here, the small T/C pressure ratio is an index of exhaust energy consumed in the small turbine 62*b*, and can be used as a rough indication of the number of revolutions of the small turbine 62*b*. Needless to say, instead of the small T/C pressure ratio, the number of revolutions of the small turbine 62*b* may be directly monitored.

Similarly, the large T/C pressure ratio is an index of exhaust energy consumed in the large turbine 61*b*, and can be used as a rough indication of the number of revolutions of the large turbine 61*b*. Instead of the large T/C pressure ratio, the number of revolutions of the large turbine 61*b* may be directly monitored.

As shown in FIG. 5, the number of revolutions of the engine linearly increases at least after time t0. As a result, the operating state of the engine 1 enters a transition region (a region corresponding to the transient operation) for shifting from the first supercharging region A to the second supercharging region B.

The PCM 10 executes the bridge control in the transition region. Through the bridge control, the throttle opening degree is changed so as to be closer to the closed side than at least immediately before the bridge control (specifically, the time t1 that is the boundary between the first supercharging region A and the transition region).

In addition, as can be seen from the progression of the R/V opening degree, before and after the execution of the bridge control, the degree of opening of the regulating valve 64*a* is set to be closer to the open side than at steady operation in the first supercharging region A (when the number of revolutions of the engine is substantially constant), and to be closer to the closed side than at steady operation in the second supercharging region B (when the number of revolutions of the engine is substantially constant).

As can be seen from the progression of the small T/C pressure ratio, the number of revolutions of the small turbine 62b is more promptly reduced than when the bridge control is not executed. On the other hand, as can be seen from the progression of the large T/C pressure ratio, the number of revolutions of the large turbine 61b is more promptly increased than when the same control is not executed.

In response to an increase in the number of revolutions of the large turbine 61b to a predetermined value or higher, the regulating valve 64a is substantially fully opened. In the example shown in FIG. 5, the bridge control is completed at the time t1, and the regulating valve 64a is substantially fully opened. Since the number of revolutions of the large turbine 61b slowly increases in the case where the known configuration is employed, the timing when the regulating valve 64a is substantially fully opened (time t2) is later than in the case where the bridge control is executed.

In this manner, since the number of revolutions of the large turbine 61b is relatively promptly increased when the bridge control is executed, the regulating valve 64a can be opened early. This allows the period of the transition region to be shorter than in the known art. In addition, since the regulating valve 64a is opened early, the back pressure is lower than in the known art. This can reduce exhaust resistance.

In the second supercharging region B after the completion of the bridge control (in particular, at steady operation in the second supercharging region B), the throttle opening degree is set to be closer to the open side than at least during the bridge control (the period during which the operating state of the engine 1 is in the transition region). In the example shown in FIG. 5, the throttle opening degree is gradually opened to its fully-open state. On the other hand, the R/V opening degree is kept at its substantially fully-open state.

In this manner, the PCM 10 executes bridge control in early stages of the shift from the first supercharging region A to the second supercharging region B. At this time, the PCM 10 controls the throttle valve 65 to allow the cross sectional area of the flow passage of exhaust gas flowing into the large turbine 61b to be smaller than at least at a point in time at which the shift from the first supercharging region A to the second supercharging region B starts. Throttling the cross sectional area of the flow passage increase the flow velocity of exhaust gas flowing into the large turbine 61b. This can increase the number of revolutions of the large turbine 61b as promptly as possible. This allows the regulating valve 64a to be opened early, and can consequently shorten the period of the shift from the first supercharging region A to the second supercharging region B.

Accordingly, when a shift is about to be made from the first supercharging region A to the second supercharging region B, the shift period can be shortened while the degree to which the boost pressure is reduced is reduced. This allows a smooth shift to be made from the first supercharging region A to the second supercharging region B.

In addition, during the bridge control, the degree of opening of the regulating valve 64a is set to be closer to the close side than at least at steady operation in the second supercharging region B. This can secure exhaust gas that flows into the small turbine 62b during the shift from the first supercharging region A to the second supercharging region B, that is, during the bridge control. This can increase the number of revolutions of the large turbine 61b while securing the number of revolutions of the small turbine 62b. Thus, the degree to which the boost pressure is reduced at the time of the shift can be reduced more effectively.

In addition, since the number of revolutions of the large turbine 61b has already been secured at steady operation after the shift to the second supercharging region B, there is no need to reduce the cross sectional area of the flow passage just like during the bridge control. Thus, at this time, the cross sectional area of the flow passage is relatively enlarged. In this manner, the flow velocity of exhaust gas flowing into the large turbine 61b can be controlled more appropriately.

In addition, since the small turbine 62b is mainly operated at steady operation in the first supercharging region A, there is no need to intentionally reduce the cross sectional area of the flow passage unlike the bridge control. Thus, at this time, the cross sectional area of the flow passage is relatively enlarged. This reduces flow resistance on the downstream side of the small turbine 62b. thus helping secure the supercharging efficiency.

—Return Control—

The switching from the second supercharging region B to the first supercharging region A is executed through an adjustment of the degree of opening of the regulating valve 64a as in the case of the switching from the first supercharging region A to the second supercharging region B. Specifically, the aforementioned R/V opening degree is substantially fully closed (first degree of opening) at steady operation in the first supercharging region A, while the R/V opening degree is substantially fully opened (second degree of opening) at steady operation in the second supercharging region B. In other words, the second degree of opening is larger than the first degree of opening.

However, when the degree of opening of the regulating valve 64a is changed so that a shift is made from the second supercharging region B to the first supercharging region A, simply changing the degree of opening of the regulating valve 64a cannot secure a sufficient number of revolutions of the small turbine 62b throughout a period from the start of changing of the degree of opening until immediately after the completion of the changing of the degree of opening. This is undesirable in consideration of the possibility of reducing the degree to which the boost pressure is reduced at the time of the shift.

Thus, when a shift is about to be made from the second supercharging region B to the first supercharging region A, the PCM 10 changes the degree of opening of the regulating valve 64a (R/V opening degree) from a substantially fully-open state to a substantially fully-closed state, and controls the throttle valve 65 to execute the return control to make the cross sectional area of the flow passage larger than at least at a point in time at which the regulating valve 64a starts changing the opening degree.

Furthermore, when executing the return control, the PCM 10 enlarges the cross sectional area of the flow passage over a longer time than a time required to change the degree of opening of the regulating valve 64a.

During the return control, the degree of opening of the regulating valve 64a is monotonously changed from the substantially fully-open state toward the substantially fully-closed state. Although the shift to the second supercharging region B is substantially completed upon the completion of the change in the degree of opening of the regulating valve 64a, the return control continues until the completion of the change in the degree of opening of the throttle valve 65. Note that the degree of opening of the throttle valve 65 is temporarily changed to the closed side before starting the return control.

Figure 6:
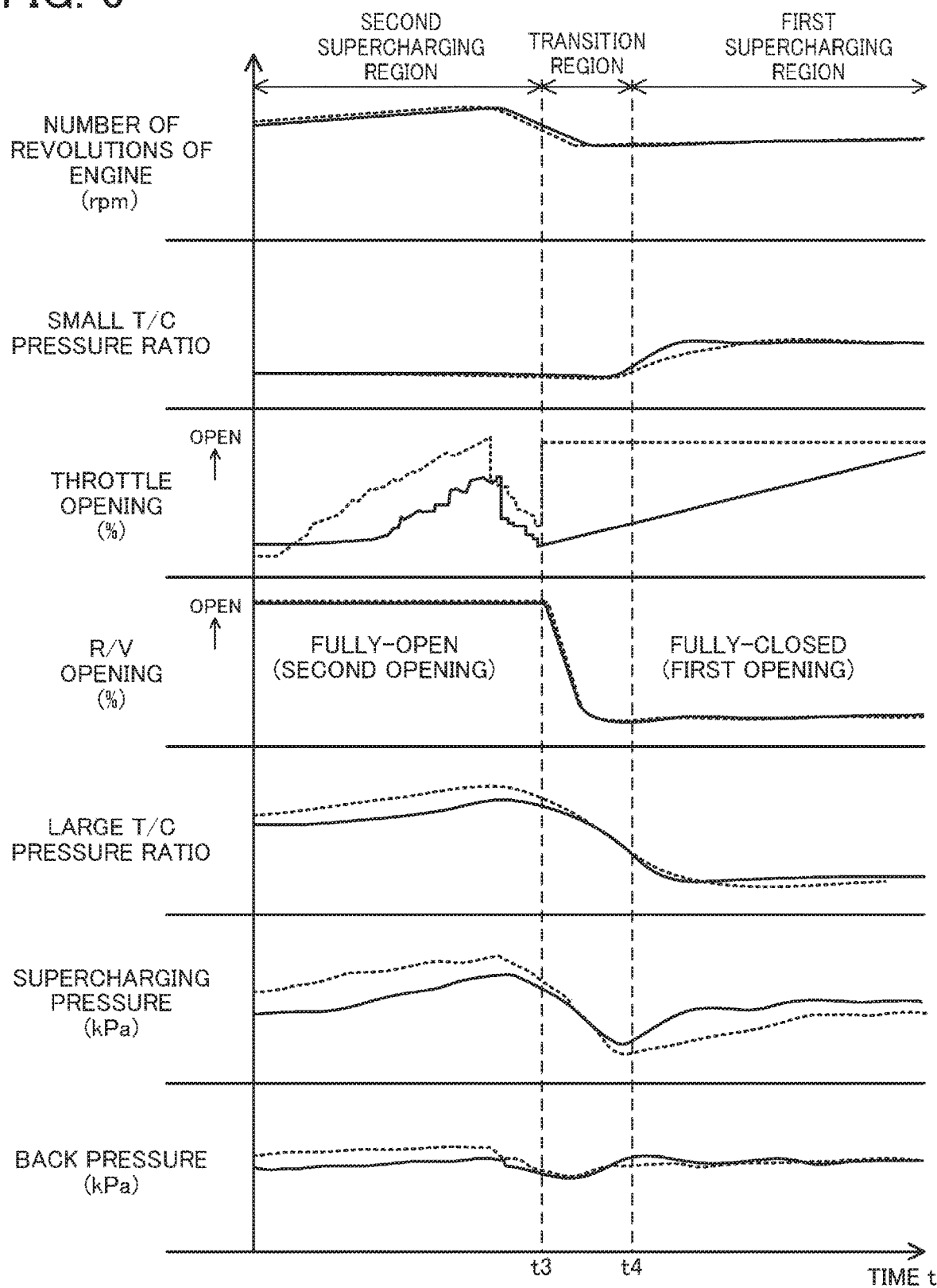
FIG. 6 is a time chart showing a specific example of a return control.

FIG. 6 is a time chart showing a specific example of the return control. Specifically, the example shown in FIG. 6 indicates changes in the ratio between the exhaust pressures on the upstream side and the downstream side of the small turbine 62b (small T/C pressure ratio), the degree of opening of the throttle valve 65 (throttle opening degree), the degree of opening of the regulating valve 64a (R/V opening degree), the ratio between the exhaust pressures on the upstream side and the downstream side of the large turbine 61b (large T/C pressure ratio), the supercharging pressure, and the exhaust pressure (back pressure) when the number of revolutions of the engine is gradually reduced. The solid line in FIG. 6 is a time chart of a case where a configuration in which the aforementioned return control is executed is employed, and the broken line is a time chart of a case where a known configuration in which the return control is not executed is employed.

As described above, the small T/C pressure ratio is a rough indication of the number of revolutions of the small turbine 62b. In contrast, the large T/C pressure ratio is a rough indication of the number of revolutions of the large turbine 61b.

As shown in FIG. 6, the number of revolutions of the engine substantially decreases at least after time t3. As a result, the operating state of the engine 1 reaches a transition region for shifting from the second supercharging region B to the first supercharging region A (the region corresponding to the transient operation).

In the transition region, the PCM 10 changes the R/V opening degree from the fully-open state to the fully-close state, and executes the aforementioned return control. The throttle opening degree is temporarily changed to the closed side, and then in response to the process related to the return control, is changed to the fully-open state over a time longer than at least that spent to change the R/V opening degree.

In addition, as can be seen from the progression of the R/V opening degree, the change in the degree of opening of the regulating valve 64a starts at the same time as that of the throttle valve 65.

As can be seen from the progression of the large T/C pressure ratio from the time t3 to time t4, the number of revolutions of the large turbine 61b is slowly lowered as compared to when the return control is not executed. As a result, the supercharging pressure is relatively slowly lowered from the time t3 to the time t4.

On the other hand, as can be seen from the progression of the small T/C pressure ratio after the time t4, the number of revolutions of the small turbine 62b is promptly increased as compared to when the return control is not executed. As a result, the supercharging pressure relatively increases after the time t4.

In this manner, the PCM 10 executes the return control to enlarge the cross sectional area of the flow passage of exhaust gas flowing into the large turbine 61b. Enlarging the cross sectional area of the flow passage reduces the flow velocity of exhaust gas flowing into the large turbine 61b, while reducing flow resistance near the small turbine 62b, which is positioned upstream of the large turbine 61b. This can increase the number of revolutions of the small turbine 62b as promptly as possible.

However, if the cross sectional area of the flow passage is steeply enlarged, the number of revolutions of the large turbine 61b may be completely dropped before the number of revolutions of the small turbine 62b is sufficiently increased. This may reduce the degree to which the boost pressure is reduced at the time of the shift.

Thus, as indicated by the time chart shown in FIG. 6, the PCM 10 enlarges the cross sectional area of the flow passage over a longer time than a time required to change the degree of opening of the regulating valve 64a, when executing the return control. This can increase the number of revolutions of the small turbine 62b while also reducing the degree to which the number of revolutions of the large turbine 61b is lowered. In this manner, it is possible to prevent the boost pressure from being reduced at the time of the shift.

What is claimed is:

1. A control device for a turbocharged engine,
the turbocharged engine comprising an exhaust passage that is connected to a combustion chamber, a first turbocharger that includes a first turbine disposed in the exhaust passage, a second turbocharger that includes a second turbine disposed downstream of the first turbine in the exhaust passage, and a plurality of nozzle vanes disposed at an outer periphery of the second turbine,
the exhaust passage including a first supercharging passage that leads exhaust gas to the second turbine via the first turbine, a second supercharging passage that bypasses the first turbine and leads exhaust gas to the second turbine, a flow velocity changer that changes a cross sectional area of a flow passage of exhaust gas flowing into the second turbine through at least either the first supercharging passage or the second supercharging passage, and a flow rate changer that opens/closes to change a flow rate of exhaust gas flowing through the second supercharging passage, the flow velocity changer being composed of the plurality of nozzle vanes,
a first supercharging region in which a gas flow through the second supercharging passage is reduced by setting a degree of opening of the flow rate changer to be a first degree of opening and a second supercharging region in which the gas flow through the second supercharging passage is allowed by setting the degree of opening of the flow rate changer to be a second degree of opening higher than the first degree of opening being used differently depending on an operating state of the engine,
the degree of opening of the flow rate changer being changed from the second degree of opening to the first degree of opening when a shift is made from the second supercharging region to the first supercharging region, the flow velocity changer being controlled to execute return control to allow the cross sectional area of the flow passage to be larger than at least at a point in time at which the flow rate changer starts changing the degree of opening, and
the flow velocity changer starting to enlarge the cross sectional area of the flow passage simultaneously with changing the degree of opening of the flow rate changer, and enlarging the cross sectional area of the flow passage over a longer time than a time required to change the degree of opening of the flow rate changer, in the return control.

2. The control device of claim 1, wherein the flow rate changer is configured as a bypass valve that opens/closes the second supercharging passage.

3. The control device of claim 1, wherein the flow velocity changer is configured as a throttle valve that can change the cross sectional area of the flow passage at an inlet of the second turbine.

4. The control device of claim 1, wherein the turbocharged engine comprises:

a housing containing both the second turbine and the plurality of nozzle vanes and connected to a downstream end of the first supercharging passage, the plurality of nozzle vanes being disposed with a gap from an inner wall of the housing.

5. A control method for a turbocharged engine, the turbocharged engine comprising an exhaust passage that is connected to a combustion chamber, a first turbocharger that includes a first turbine disposed in the exhaust passage, a second turbocharger that includes a second turbine disposed downstream of the first turbine in the exhaust passage, and a plurality of nozzle vanes disposed at an outer periphery of the second turbine, the exhaust passage including a first supercharging passage that leads exhaust gas to the second turbine via the first turbine, a second supercharging passage that bypasses the first turbine and leads exhaust gas to the second turbine, a flow velocity changer that changes a cross sectional area of a flow passage of exhaust gas flowing into the second turbine through at least either the first supercharging passage or the second supercharging passage, and a flow rate changer that opens/closes to change a flow rate of exhaust gas in the second supercharging passage, the flow velocity changer being composed of the plurality of nozzle vanes, the control method comprising:

in a first supercharging region, reducing a gas flow through the second supercharging passage by setting a degree of opening of the flow rate changer to be a first degree of opening; and in a second supercharging region, allowing the gas flow through the second supercharging passage by setting the degree of opening of the flow rate changer to be a second degree opening higher than the first degree opening being used differently depending on an operating state of the engine;

changing the degree of opening of the flow rate changer from the second degree of opening to the first degree of opening when a shift is made from the second supercharging region to the first supercharging region;

controlling the flow velocity changer to execute return control to allow the cross sectional area of the flow passage to be larger than at least at a point in time at which the flow rate changer starts changing the degree of opening; and starting to enlarge the cross sectional area of the flow passage, via the flow velocity changer, simultaneously with changing the degree of opening of the flow rate changer, and enlarging, via the flow velocity changer, the cross sectional area of the flow passage over a longer time than a time required to change the degree of opening of the flow rate changer, in the return control.

\* \* \* \* \*